(12) United States Patent
Gibson

(10) Patent No.: US 7,239,600 B2
(45) Date of Patent: Jul. 3, 2007

(54) STORAGE DEVICE BASED ON PHASE-CHANGE MODULATED LUMINESCENCE

(75) Inventor: Gary Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 568 days.

(21) Appl. No.: 10/699,150

(22) Filed: Oct. 30, 2003

(65) Prior Publication Data

US 2005/0094533 A1    May 5, 2005

(51) Int. Cl.
*G11B 9/00* (2006.01)
(52) U.S. Cl. .................. 369/126; 369/101; 365/151
(58) Field of Classification Search ............... 369/126, 369/284; 136/257
See application file for complete search history.

(56) References Cited

U.S. PATENT DOCUMENTS

| 4,982,362 A | * | 1/1991 | Comberg et al. ............ 365/118 |
| 5,557,596 A | | 9/1996 | Gibson |
| 6,125,095 A | * | 9/2000 | Gemma et al. .............. 369/126 |
| 2003/0218941 A1 | * | 11/2003 | Terao et al. .............. 369/13.01 |

* cited by examiner

*Primary Examiner*—Wayne Young
*Assistant Examiner*—Thomas Alunkal

(57) ABSTRACT

A media storage device is provided. The device comprises different configurations of a luminescent layer comprising a luminescent material capable of emitting light while being bombarded by a beam from a beam transmitter, a detector for detecting the light emitted from the luminescent layer, and a phase-change layer located proximate the luminescent layer. The phase-change layer is able to transform from a first phase to a second phase. Light emitted from the luminescent layer and received by the detector materially differs when the phase-change layer transforms from the first phase to the second phase.

39 Claims, 13 Drawing Sheets

STORAGE DEVICE BASED ON PHASE-CHANGE MODULATED LUMINESCENCE

BACKGROUND OF THE INVENTION

1. Field of the Invention

The present invention relates generally to the field of thermal writing of high density data media, and more particularly to the specific composition and methods of forming high density data recording products.

2. Description of the Related Art

Phase-change media are a widely available means for providing high density data storage, and such media may include CD-RW, DVD-RAM, and DVD-RW formats, among others. In this type of media, data is stored at a particular location, typically micron sized, and storage and erasure occurs based on the microstructure of the target region. FIG. 1 illustrates an ultra-high-density data storage device disclosed in U.S. Pat. No. 5,557,596 to Gibson et al. (the '596 patent). The ultra-high-density data storage device includes a set of field emitters 100, a data storage layer 110 that is located below the field emitters 100, a micromover 120 that holds the data storage layer 110 below the field emitters 100 and that can position the data storage layer 110 at desired locations relative to the field emitters 100, and electrical connections 130 that can supply energy to the field emitters 100. When supplied with energy, the field emitters 100 can bombard the data storage layer 110 with electron beams and can transform nanometer-scaled portions of the data storage layer from unwritten data bits, designated in FIG. 1 by the reference numeral 140, to written data bits, designated by the reference numeral 150. This transformation occurs via a writing process, discussed below.

When writing data to the data storage layer 110, respective field emitters 100 are energized through the electrical connections 130 and bombard the selected unwritten data bits 140 with electron beams. During the writing process, the electron beams are of sufficient power density to transform the bombarded unwritten data bits 140 from a first material state (e.g. a crystalline state, which may be assigned a "0" value) to a second material state (e.g. an amorphous state, which may be assigned a "1" value). Hence, a data bit having a value of "1" can be written to and stored on the data storage layer 110 by bombarding a crystalline, unwritten data bit 140 and by appropriately cooling (quenching) the data bit 140 to form an amorphous, written data bit 150, respectively.

When erasing data from the data storage layer 110, respective field emitters 100 are energized, through the electrical connections 130, and are made to bombard the selected written data bits 150 with electron beams. During the erasing process, the electron beams are of sufficient power density to transform the bombarded written data bits 150 from a second material state (e.g., an amorphous state, which may be assigned a "1" value) to a first material state (e.g., a crystalline state, which may be assigned a "0" value). Hence, a data bit having a value of "0" can be restored on the data storage layer 110 by bombarding an amorphous, written data bit 150, thereby appropriately heating (annealing) the data bit 150 to form a crystalline, erased data bit 140.

When reading data from the storage layer 110, the field emitters 100 again bombard the data bits 140, 150 with electron beams. However, instead of bombarding the data bits 140, 150 with electron beams that have sufficient energy to transform the data bits 140, 150 between the first and second material states discussed above, the field emitters 100 bombard the data bits 140, 150 with relatively low-power-density electron beams that do not effectuate a transformation but that do effectuate identification. Then, the interactions between the low-power-density electron beams and the data bits 140, 150 are monitored in order to read data.

During the reading operation, the low-power-density beams interact differently with unwritten data bits 140 than with written data bits 150. For example, a low-power-density beam may generate fewer secondary electrons when bombarding a crystalline, unwritten data bit 140 than when bombarding an amorphous, written data bit 150. Therefore, by monitoring the interactions between the relatively low-power-density beam and the data bit 140, 150 that the beam is bombarding (e.g. by monitoring the number of secondary electrons generated), it becomes possible to determine whether the bombarded data bit 140, 150 is storing a "1" or a "0" value and to read data stored in the data storage layer 110.

Certain implementations of the foregoing design have used a luminescent material on top of the phase-change material which, in turn, was above a photodetector. The various states of the of the phase-change layer, in both a written configuration and unwritten configuration, have different absorption and/or reflection coefficients for light given off by the luminescent material. Data may be read back using a low power density electron or optical beam to stimulate luminescence in the luminescent layer. Depending on the state of the phase-change layer below the area of the luminescent layer being stimulated, more or less light passes through the phase-change layer to the photodetector. The state of the phase-change layer in the region being addressed, either more or less absorptive and/or more or less reflective, may be assessed by monitoring light reaching the photodetector.

The problem with this light monitoring approach is that the luminescent layer must be manufactured on top of the phase-change layer, where "on top" refers to placing a layer further away from the base layer, or outward from the base layer of the medium. Placing a luminescent layer on top of the phase-change layer can require processing temperatures and conditions harmful to the phase-change layer. Further, during the write process, the luminescent layer must in certain cases withstand temperature changes higher than those required to affect the phase-change in the phase-change layer. The luminescent layer must also withstand bombardment by high energy electrons in some circumstances. High temperatures and/or bombardment by high energy electrons can adversely affect the luminescent properties of the luminescent layer.

Another potential disadvantage of this scheme is that the photodetector is below the phase-change layer, which can make manufacturing more difficult. Other problems may arise if too much light is absorbed or reflected in unwritten portions of the phase-change layer below a written bit intended to be transmissive, or if too much light internally reflects at the bottom surface of the phase-change layer. Also, in certain designs, significant light may be lost through the top surface of the luminescent layer rather than reflected down toward the phase-change layer where it can add to the signal. In certain other designs, a protective top layer may be needed over the luminescent layer to prevent unwanted changes or degradation during the reading and writing processes.

It would be advantageous to provide media having a phase-change-layer in combination with a luminescent material and detector that enables thermal writing and erasure of said media in a relatively efficient manner and avoids the problems associated with previous designs.

SUMMARY OF THE INVENTION

According to a first aspect of the present design, there is provided a data storage device for use with a beam transmitter configured to transmit a beam. The device comprises a luminescent layer comprising a luminescent material capable of emitting light while being bombarded by the read beam from the beam transmitter, a detector located near the luminescent layer for detecting the light emitted from the luminescent layer, and a phase-change layer located between the luminescent layer and the detector. The phase-change layer is able to transform from a first phase to a second phase. Light emitted from the luminescent layer and received by the detector materially differs when the phase-change layer transforms from the first phase to the second phase.

According to a second aspect of the present design, there is provided a data storage device for use with a beam transmitter configured to transmit a beam. The device comprises a luminescent layer comprising a luminescent material capable of emitting light while being bombarded by the beam from the beam transmitter, a phase-change layer located between the luminescent layer and the beam transmitter, the phase-change layer able to transform from a first phase to a second phase, and a detector located proximate the luminescent layer for detecting the light emitted from the luminescent layer. The luminescent layer is positioned between the phase-change layer and the detector. Light emitted from the luminescent layer and received by the detector materially differs when the phase-change layer transforms from the first phase to the second phase.

According to a third aspect of the present design, there is provided a device for use with a beam transmitter configured to transmit a beam. The device comprises a luminescent layer comprising a luminescent material capable of emitting light while being bombarded by the beam from the beam transmitter, a detector located near the luminescent layer and the beam transmitter for detecting the light emitted from the luminescent layer, and a phase-change layer located adjacent the luminescent layer such that the luminescent layer is positioned between the detector and the phase-change layer. The phase-change layer is able to transform from a first phase to a second phase. Light emitted from the luminescent layer and received by the detector materially differs when the phase-change layer transforms from the first phase to the second phase.

According to a fourth aspect of the present design, there is provided a method for storing data on a data storage device, the data storage device comprising a phase change layer and a luminescent layer. The method comprises bombarding the luminescent layer with a beam, causing the luminescent layer to emit light, detecting the light emitted from the luminescent layer using a detector, and writing data by transforming the phase change layer from a first phase to a second phase. Light emitted from the luminescent layer and detected by the detector materially differs when the phase-change layer transforms from the first phase to the second phase.

These and other objects and advantages of all aspects of the present invention will become apparent to those skilled in the art after having read the following detailed disclosure of the preferred embodiments illustrated in the following drawings.

DESCRIPTION OF THE DRAWINGS

The present invention is illustrated by way of example, and not by way of limitation, in the figures of the accompanying drawings in which.

DETAILED DESCRIPTION OF THE INVENTION

Figure 1:
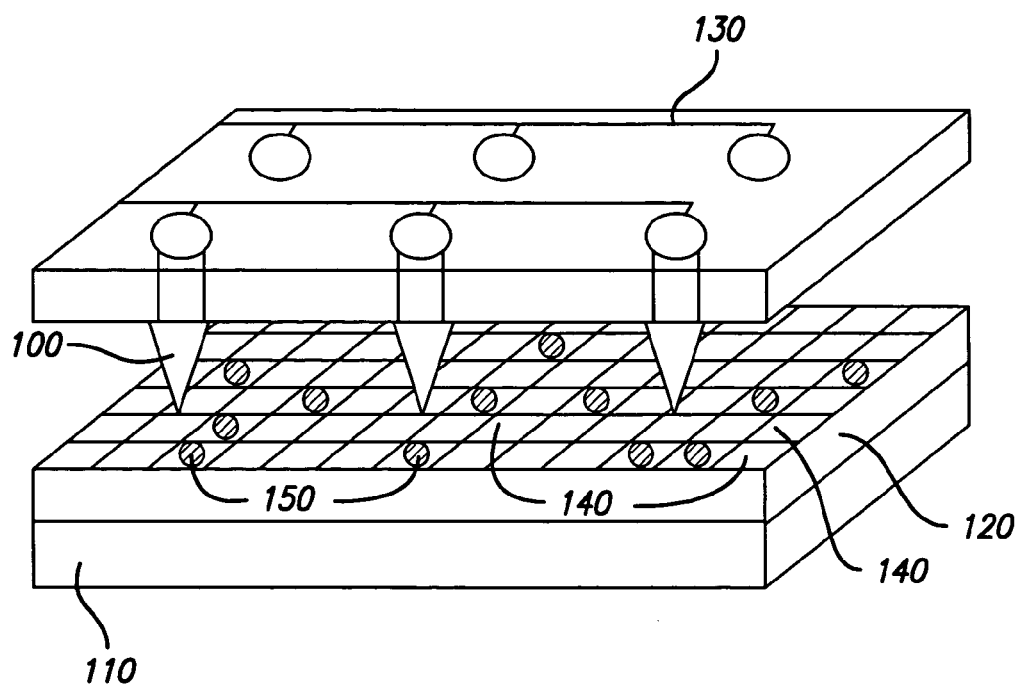
FIG. 1 illustrates a side perspective view of a data storage device according to the related art.
Figure 2:
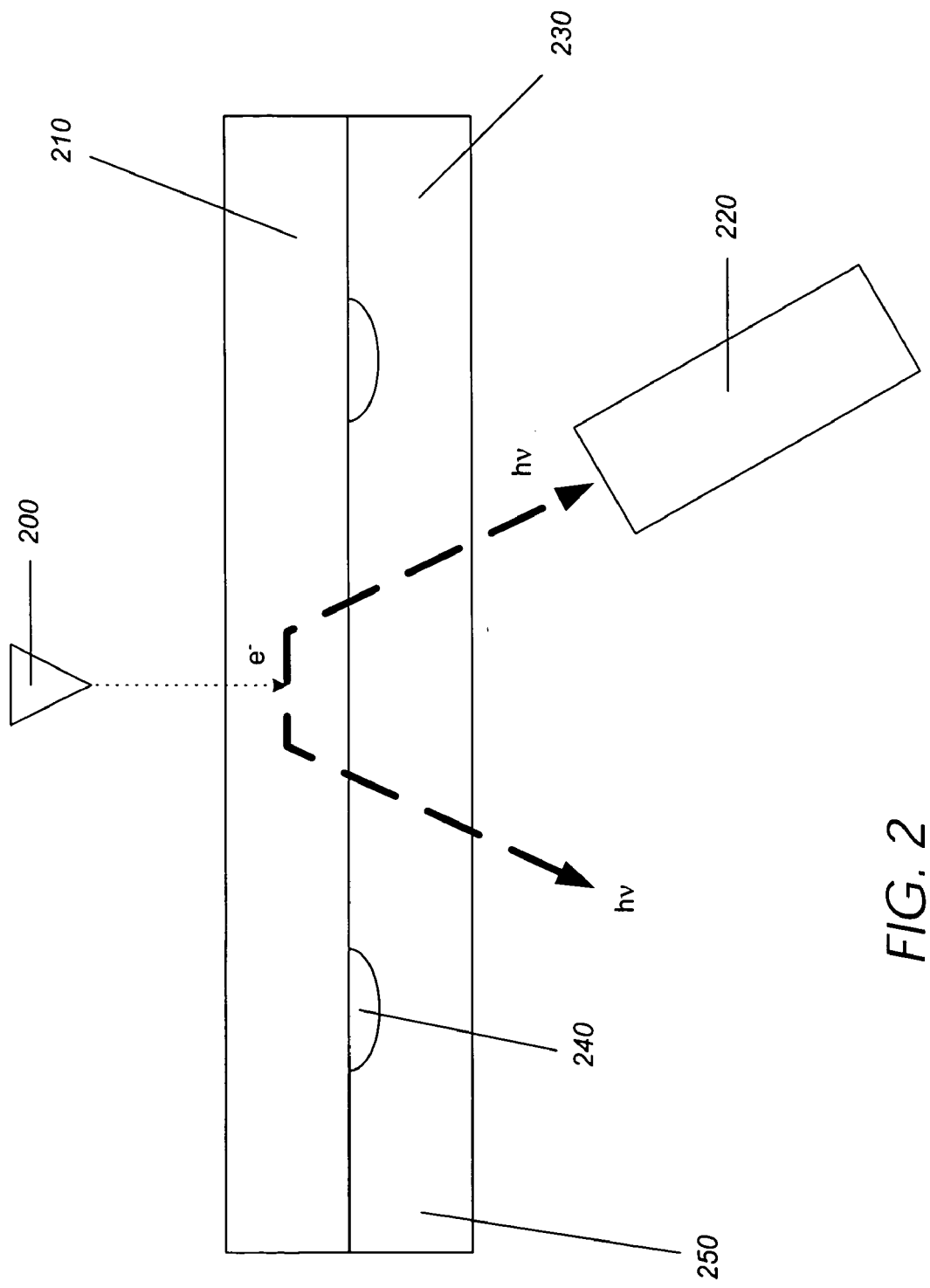
FIG. 2 is a cross-sectional view of a data storage device having a luminescent layer and a phase-change layer.

FIG. 2 shows a cross-sectional view of an ultra-high-density data storage device. The device includes a beam source 200, which may be a device capable of emitting a light beam or an electron beam, e$^-$, of either a high or low power density. FIG. 2 illustrates an electron beam, e$^-$, being transmitted by the beam source 200. As used herein, the term "beam source" may apply to a device capable of emitting an optical beam, such as a light beam, or an electron beam, and embodiments described and drawings included are not intended to be limiting as to the type of beam that may be emitted from the beam source unless otherwise indicated. The electron beam, e$^-$, illustrated in FIG. 2 can be focused to a sub-micron-scaled spot size.

As understood in the art, beam sources 200 are capable of emitting an electron beam focusable to a nanometer-scaled spot size. The beam source 200 may be a field emitter, Schottky emitter, or another such device capable of emitting energy in the form of an electron beam, or a Light Emitted Diode (LED) or laser, or another such device capable of emitting energy in the form of a light beam. In either case, the beam source 200 can provide a beam of either high or low power density with the desired spot size.

Proximate to and, as illustrated in FIG. 2, below the beam source 200 is a luminescent layer 210. The luminescent layer 210 includes a luminescent material capable of emitting light while being bombarded by an electron beam or light beam from the beam source 200. The luminescent layer 210 may include an yttrium-aluminum-garnet (YAG)-based or yttrium-aluminum-perovskite (YAP)-based material. The luminescent layer 210 may also include rare earth element dopants and/or at least one of zinc oxide, GaN, zinc sulfide, and $Si_3O_4$.

With reference again to FIG. 2, a portion of the light emitted by the luminescent layer 210 is represented by broken lines and designated by the reference symbol hυ. Although light is generally emitted in all directions, for the purpose of clarity, only portions of the light that travel downward from the luminescent layer 210 are illustrated.

Adjacent to the luminescent layer 210 is a phase-change layer 230. As will be discussed below, the phase-change layer 230 is capable of being locally transformed from a first phase to a second phase and may, in some embodiments, be located immediately adjacent to the luminescent layer 210, sharing an interface. In some embodiments, an anti-reflective coating may also be present at this interface. A detector 220 may be positioned such that the detector 220 is located near the phase-change layer 230 (e.g., within several micrometers). According to alternate embodiments, a detector 220 may even be in contact with the phase-change layer 230. For example, the phase-change layer 230, an optional anti-reflective coating (not illustrated in FIG. 2), and a luminescent layer 210 could be deposited on a detector 220 such as, but not limited to, a photodiode or phototransistor. As used herein, the term "detector" is intended to mean any type of detection device capable of receiving energy according to the functionality described herein, and may include a photodetector, where a photodetector is a device that detects photons and may include, but is not limited to, photodiodes, phototransistors, and similar devices.

Multiple detectors 220 may be used in the ultra-high-density data storage device, especially when parallel read channels are included in the device. When multiple detectors 220 are used, in order to minimize cross-talk between adjacent data bits and detectors 220, the detectors 220 may be located closer to the phase-change layer 230 than to each other.

The detector 220 or detectors 220 discussed above are typically capable of sensing the light, hυ, that is being emitted from the luminescent layer 210. However, in order to be detected by a detector 220, the light, hυ, must be able to travel to the location of the detector 220 for detection. In certain data storage devices, the detector 220 is chosen such that the detector 220 selectively detects light in a wavelength range that does not exactly match the wavelength range of the light emitted by the luminescent layer 210. These types of detectors 220 will be further discussed with reference to FIG. 6.

The transformation in the phase-change layer 230 between the first phase and the second phase may be induced by the beam source 200. The transformation may be induced if the beam source 200 emits a sufficiently high-power-density light or electron beam with an appropriate pulse shape. The electron or light beam may also be incident on (i.e., bombard) a region of the phase-change layer 230 or a region of the luminescent layer 210 adjacent to the region of the phase-change layer 230 to be written to/phase-changed.

Figure 3:
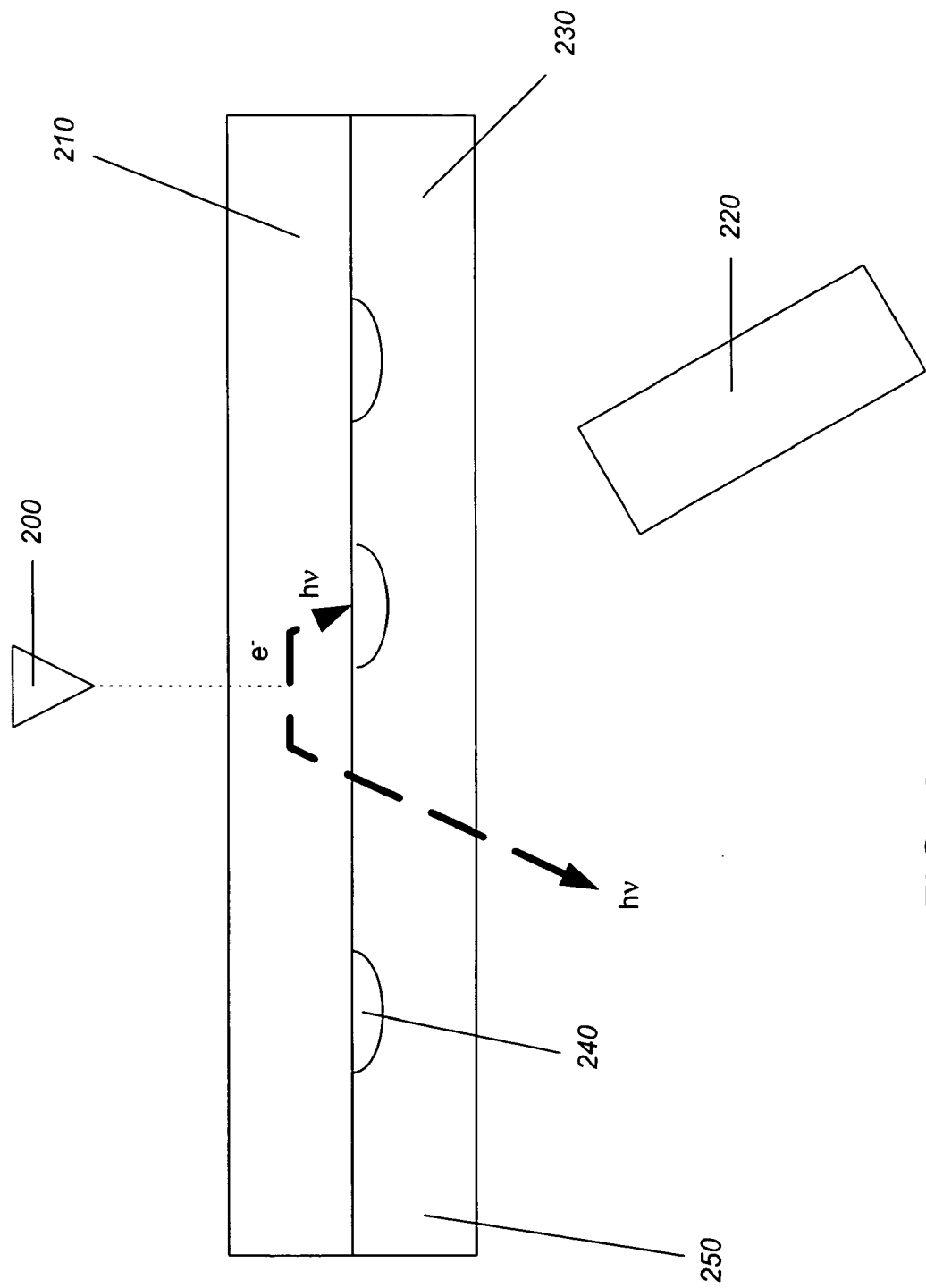
FIG. 3 is a cross-sectional view of the data storage device illustrated in FIG. 2 wherein the optically opaque second-phase region is positioned between the location in the luminescent layer where light is generated and the detector.

As understood to those skilled in the art, repeated bombardments of the phase-change layer 230 or of a region of the luminescent layer 210 adjacent to the phase-change layer 230 with sufficiently high-power-density beams, along with appropriate cooling conditions, can lead to the presence of multiple second-phase regions 240 in a first-phase region 250 of the phase-change layer 230, as shown and described in more detail in FIG. 3.

According to the data storage device illustrated in FIG. 2, once light is stimulated in the luminescent layer 210, at least a portion of the stimulated light may travel relatively freely through the first-phase region 250 of the phase-change layer 230. This is true because the first-phase region 250 in FIG. 2 is generally optically transparent or transmissive of the light It may further be possible to begin with a non-transmissive film and write transmissive bits. In the case of an optically transparent or transmissive first phase region 250, as shown in FIG. 3, if the light attempts to travel through a second-phase region 240, the light is at least partially absorbed by the second-phase region 240 (in certain embodiments, some of the light may also or instead be reflected). Hence, if a second-phase region 240 is positioned between the location where the light is stimulated in the luminescent layer 210 and the detector 220, as shown in FIG. 3, most or all of the light will be unable to reach the detector 220 and will not be detected.

The luminescent layer 210, together with the phase-change layer 230, make up the data storage medium of the device illustrated in FIGS. 2-3, and the first-phase regions 250 and the second-phase regions 240 make up the respective data bits. If desired, a first-phase region 250 may be assigned, for example, a value of "0", and a second-phase region 240 may be assigned, for example, a value of "1". When reading data from the storage medium, light emission may be stimulated in a localized region of the luminescent layer 210 with an electron beam at a reduced power density, that does not induce writing or erasing in neighboring regions of the phase-change layer, from an beam source 200. The reduced or relatively low-power-density electron beam travels into the luminescent layer 210 and stimulates light emission.

The detector 220 may be used to monitor the amount of emitted light received. When no second-phase region 240 is present between the location at which light emission has been stimulated and the location of the detector 220 to block emissions, the detector 220 may detect a relatively large amount of light. If, however, a second-phase region 240 is present between the location of light emission and the location of the detector 220, substantially blocking emissions, the detector 220 may detect a relatively small amount of light. Hence, by continuously bombarding the storage medium with a reduced-power-density beam of substantially constant power and by causing a relative motion between an beam source 200 and the storage medium, "1" data bits may be detected or read from the storage medium when the detector 220 detects relatively little light, and "0" data bits may be read from the storage medium when a relatively large amount of light is detected. This allows for data retrieval from the ultra-high-density data storage device illustrated in FIGS. 2-3.

Writing data to an ultra-high-density data storage device, such as the one illustrated in FIG. 2, includes transforming one or more portions of the phase-change layer 230 from a transparent first phase to an opaque second phase, or vice-versa, to form respective first-phase regions 250 and second-phase regions 240 in the phase-change layer 230. As discussed above, phase transformations may be effectuated by bombardment of selected regions of the phase-change layer 230 with an electron beam and appropriate subsequent cooling of the bombarded regions. For example, an optically transmissive, crystalline first phase of a material may become an opaque, amorphous second phase if bombarded by an electron beam with sufficient power density to melt the material and subsequently cooled rapidly enough to quench the material. Similarly, an optically opaque, amorphous first phase may become an optically transmissive, crystalline second phase if bombarded by an electron beam with sufficient power density to heat the amorphous material above its crystallization temperature, thereby annealing the amorphous material.

As an alternate example, the beam may bombard an optically opaque compound in the phase-change layer 230, forming the aforementioned second-phase region 240, and transform the opaque compound into a transparent compound by volatilization, oxidation, and so forth. The opaque compound could then be the first material state and the transparent compound could be the second material state.

Another alternative for writing to the storage medium includes first locally heating the luminescent layer 210 with an electron beam. Then, as the heat in the luminescent layer 210 dissipates or travels from the luminescent layer 210 to the phase-change layer 230, the heat can locally transform a portion of the phase-change layer 230 from a first phase to a second phase. Such a writing process works best when the luminescent layer 210 has a higher melting temperature than the phase-change layer 230. This is true because it is generally preferable that melting of the luminescent layer 210 be prevented when writing to the phase-change layer 230. The luminescent layer 210 may also be chosen to include a material whose luminescent properties are not damaged by the temperature attained within the luminescent layer 210 as the phase-change layer 230 is written to.

According to the writing process that includes locally heating the luminescent layer 210 to transform the phase-change layer 230, the luminescent layer 210 may be chosen to include a material that has a high thermal conductivity (e.g. a higher thermal conductivity than a material included in the phase-change layer 230). When a material with a high thermal conductivity is included in the luminescent layer 210, the temperature gradient across the luminescent layer 210 can be minimized, thereby lessening the chance that the temperature of any part of the luminescent layer 210 will become hot enough to incur damage as a result of the localized heating.

On the other hand, the luminescent layer 210 may be chosen to include a material that has a low thermal conductivity (e.g. a lower thermal conductivity than a material included in the phase-change layer 230). When a material with a low thermal conductivity is included in a thin luminescent layer 210, smaller data bits may be written to the phase-change layer 230 because the heat that transforms the phase-change layer 230 may be more highly localized. Such smaller data bits allow for a higher density of data to be stored in the storage medium. In addition, lower thermal conductivities for the luminescent and phase-change layers can reduce the power required to effect the phase-change, thereby allowing for the use of less powerful beam sources 200 or emitters, lowering the overall power requirements of the device, and so forth.

Once written to, the storage medium can store data that may be read by the reading method discussed above. This allows for the non-volatile data storage in sub-micron-scaled or, in some cases, in nanometer-scaled data bits.

It should be understood that, in certain embodiments, the second-phase portions 240 of the phase-change layer 230 may extend close to (or all the way up to) the interface between the luminescent layer 210 and the phase-change layer 230. In such embodiments, the luminescent layer's local radiative and non-radiative recombination rates near the interface may depend on whether the neighboring regions of the phase-change layer 230 are in a first phase or a second phase. Hence, in these embodiments, when bombarding the luminescent layer 210 with a low-power-density electron beam, different amounts of light may be generated, dependent on whether a first-phase region 250 or a second-phase region 240 is located near the interface. This provides another contrast mechanism whereby data bits can be read by measuring the relative amount of light reaching the detector 220 as the beam source 200 and the storage medium move relative to each other.

Figure 4:
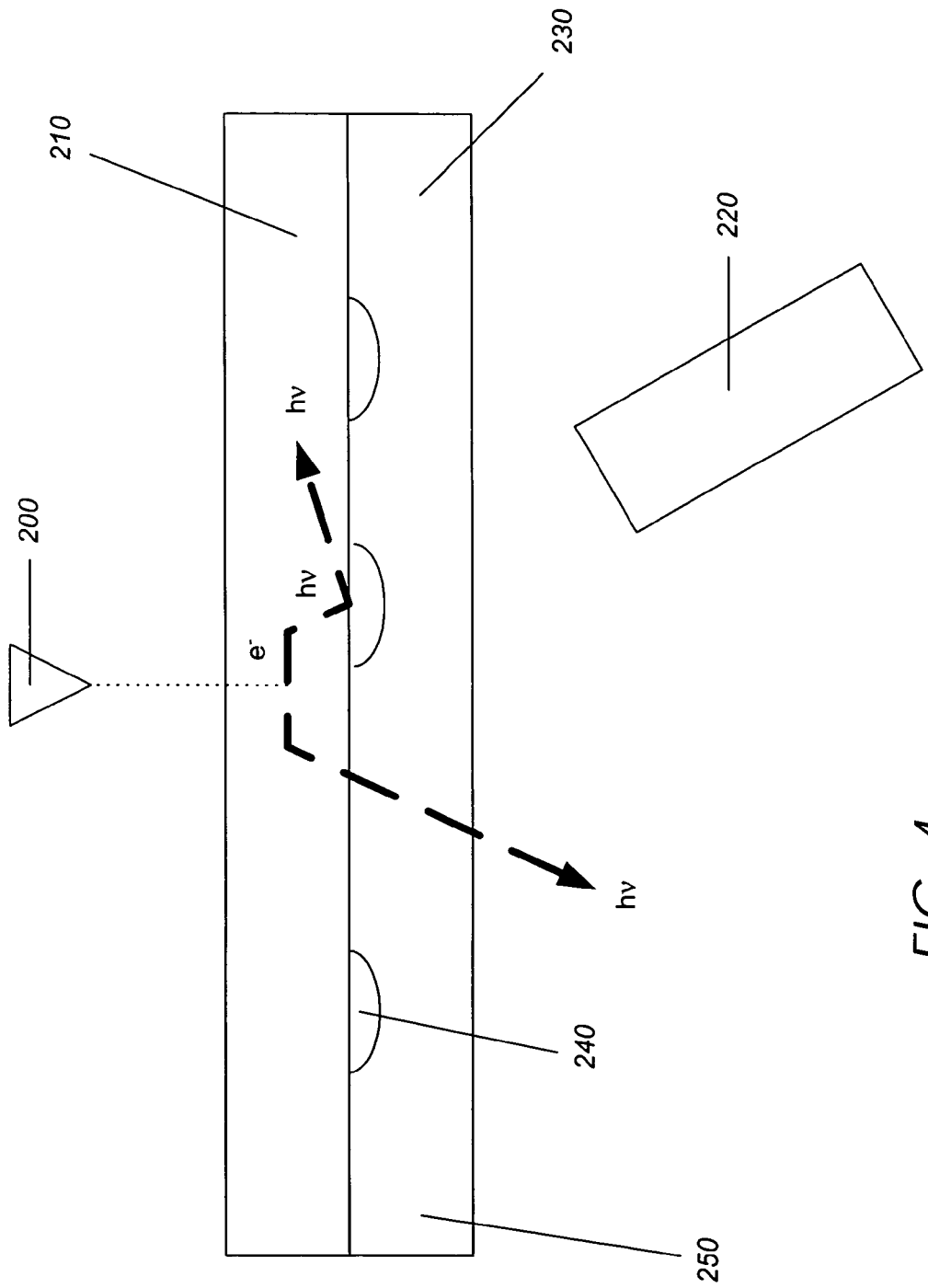
FIG. 4 is a cross-sectional view of a data storage device having a luminescent layer and a phase-change layer wherein the phase-change layer includes an optically transparent first-phase region and a reflective second-phase region.

With reference now to FIG. 4, there is illustrated a cross-sectional view of another ultra-high-density data storage device having a luminescent layer 210 and a phase-change layer 230. The device in FIG. 4 has a phase-change layer 230 that includes an optically transparent first-phase region 250 and several reflective second-phase regions 240. The first-phase region 250 transmits a majority of the light that attempts to travel through the first-phase region 250. However, the second-phase regions 240 reflect a majority of the light that attempts to travel through the second-phase regions 240. (In some embodiments of ultra-high-density data storage devices, the second-phase regions 240 may also absorb a significant portion of the light that attempts to travel through the second-phase regions 240, which is one way in which the second-phase regions 240 of FIG. 3, for example, can provide opacity.) Hence, when reading data from the device illustrated in FIG. 4, the beam source 200 and storage medium may be moved relative to each other while the beam source 200 emits a reduced-power-density electron beam of substantially constant power. A detector 220 may then be used to monitor the amount of light reaching the detector 220. Low levels of light detection may result in the detection or reading of "1" data bits while high levels of light detection may result in the detection or reading of "0" data bits, or vice-versa.

Analogously to the data storage device illustrated in FIGS. 2-3, the second-phase regions 240 may be written in the phase-change layer 230 by using an electron beam and appropriate cooling conditions. In some data storage devices, such as the devices illustrated in FIGS. 2-5, appropriate cooling conditions for transforming regions between the first and second phases may require only sufficiently fast turn-off of the electron bean under ambient temperatures. Hence, additional cooling components may not be necessary.

Figure 5:
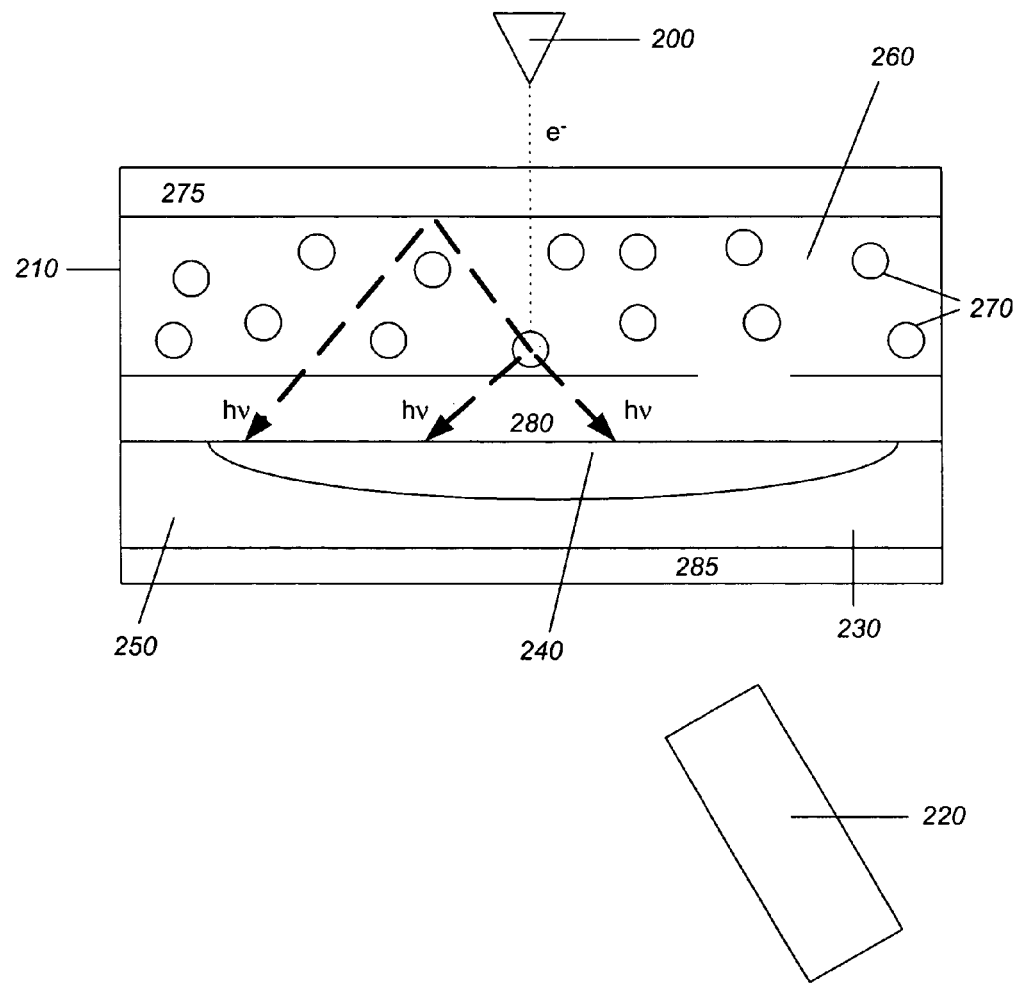
FIG. 5 is a cross-sectional view of a data storage device that includes an index-matching layer, a phase-change layer, and an optically neutral medium containing optically active nanoparticles.

With reference now to FIG. 5, there is shown a cross-sectional view of an ultra-high-density data storage device where the luminescent layer 210 includes an optically neutral medium 260 and optically active nanoparticles 270 (i.e., nanometer-scaled particles) that are contained in the optically neutral medium 260. The device illustrated in FIG. 5 also includes an optional reflective coating 275, positioned near the beam source 200, that reflects light from the luminescent layer 210 towards the detector 220. An optional first index matching layer 280 (which may be anti-reflective) is positioned between the aforedescribed luminescent layer 210 and the phase-change layer 230. Optionally, the storage medium may include a second index matching layer 285 (which may be anti-reflective) that may be positioned between the phase-change layer 230 and the detector 220.

The nanoparticles 270 may include, among other materials, II-VI and III-V semiconductor compounds. The luminescent layer 210 may include, among other materials, ZnO, GaN, YAG, YAP, and ZnS. The phase-change layer 230 may include, for example, a chalcogenide-based phase-change material similar to those used in optical recording. The first-phase region 250 could then, for example, be the crystalline state of one of these materials and the second-phase region 240 could be the amorphous state. The exact phase-change material chosen could then depend on the wavelength range that the luminescent layer 210 luminesced in, as well as the wavelength range that the detector 220 was sensitive to. Further, the combination of phase-change layer 230, luminescent layer 210, and detector 220 could be chosen to optimize the signal-to-noise. The choice of the phase-change layer 220 could also depend on how low a melting point is needed so as not to damage the other layers, the reactivity of the phase-change layer 220 with neighboring layers, and so forth.

The reflective coating 275 may be chosen to be very thin (e.g., less than one micron thick) and is preferably heat-resistant, thus preventing damage to the reflective properties of the reflective coating's 275 interface with the luminescent layer 210. The first index matching layer 280 and the second index matching layer 285 and/or reflective layer may also be chosen to be very thin and heat-resistant.

Among the reasons for making the luminescent layer 210, the reflective coating 275, and the first index matching layer 280 thin is to minimize the temperature change across them. If these layers 210, 275, 280 are thick, then the surface closest to the emitter will get much hotter than the temperature required to effect the phase-change in phase-change layer 230. Another reason for making the layers 210, 275, 280 thin is that it becomes difficult to write small data bits in the phase-change layer 230 if the layers 210, 275, 280 are thick since thicker layers allow the heat to spread laterally before reaching the phase-change layer 230.

When bombarded by a reduced-power-density electron beam, the nanoparticles 270 in this data storage device emit light. A portion of the emitted light travels towards the detector 220 for detection or may be substantially (e.g., more than 80%) absorbed, substantially reflected away from the detector 220, or both, depending upon the type of second-phase region 240 that is present in the phase-change layer 230. Hence, the reading and writing steps discussed above with reference to FIGS. 2-4 are readily applicable to the device illustrated in FIG. 5.

The index matching layer 280 illustrated in FIG. 5 tends to maximize the amount of light that travels out of the luminescent layer 210. Since adjacent materials with similar indices of refraction reflect less light at their interfaces, the device illustrated in FIG. 5 may allow more light to travel towards the detector 220 than would a device without the index matching layer 280. Hence, smaller amounts of light need to be generated in the luminescent layer 210 to allow for detection by the detector 220.

Figure 6:
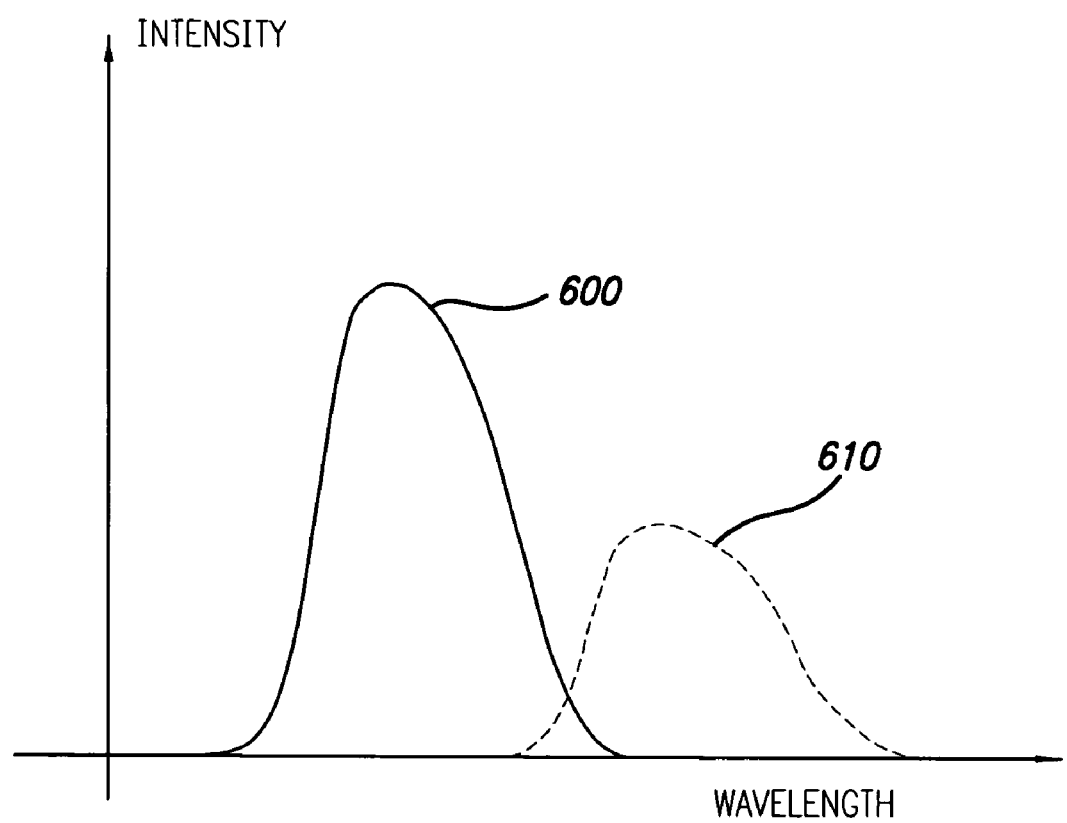
FIG. 6 is a graph of an absorption spectrum of one material in the phase-change layer and a shifted emission spectrum of the same material.

With reference now to FIG. 6 of the Drawings, there is illustrated a graph of an absorption spectrum 600 of one material that may be included in one of the phase-change layers 230 discussed above, and a graph of a shifted emission spectrum 610 of the same material. Certain ultra-high-density data storage devices include absorptive second-phase regions 240 that absorb a majority of light in a first wavelength range that attempts to pass through the second-phase regions 240 (e.g., the wavelength range of the light emitted by the luminescent layer 210). The second-phase regions 240 then re-emit at least some of the absorbed light in a second wavelength range (e.g., a wavelength range to which the detector 220 is sensitive).

When re-emitting second-phase regions 240 are used in data storage devices, such as those illustrated in FIGS. 2-3 and 5, additional reading methods are generally available. For example, a detector 220 may be provided that detects light in a selected subsection of the re-emission wavelength range 610. Then, light emission may be stimulated from the luminescent layer 210 in the absorption wavelength range 600. The absorption wavelength range 600 may, as shown in FIG. 6, overlap slightly with the re-emission wavelength range 610 or may not overlap at all with the re-emission wavelength range 610. Then, if at least some of the light emission from the luminescent layer 210 is absorbed with a second-phase region 240 of the phase-change layer 230 (i.e., if there is a second-phase region 240 between the location of light emission in the luminescent layer 210 and the detector 220), then the absorbed light emission may be at least partially re-emitted by the second-phase region 240 in the re-emission wavelength range 610.

Thus, a detector 220 that is selected to detect light preferentially or solely over a subset of wavelengths in the re-emission wavelength range 610 but not in the emission wavelength range 600 can be used to detect second-phase regions 240. By detecting the presence or absence of second-phase regions 240, "0" and "1" data bits may be read from the storage medium. Such detection may also be more sensitive and/or less noisy since the phase-change layer 230 may be chosen to include a material that can provide more contrast and/or better signal-to-noise in the wavelength range to which the detector 220 is sensitive as compared to devices that rely on changes in light absorption and/or reflection.

In some embodiments, the material in the phase-change layer 230 may provide a large modulation in the light reaching the detector 220 only in the wavelength range monitored by the detector 220. In these embodiments, noise from a relatively constant background of unmodulated light at other wavelengths may be eliminated by using a detector 220 that only monitors the modulated light. Another advantage of using a detector 220 that only detects a selected wavelength range is that the detector 220 may be easier and/or cheaper to incorporate into the manufacturing process for the device.

To efficiently re-emit light, one possibility is to dope the phase-change layer 230 with a material that causes radiative defects at a desired wavelength. Alternatively, some direct bandgap phase-change layers 230 may re-radiate efficiently in the crystalline state without defects. Either of these possibilities may be used according to the devices and methods discussed herein.

Figure 7:
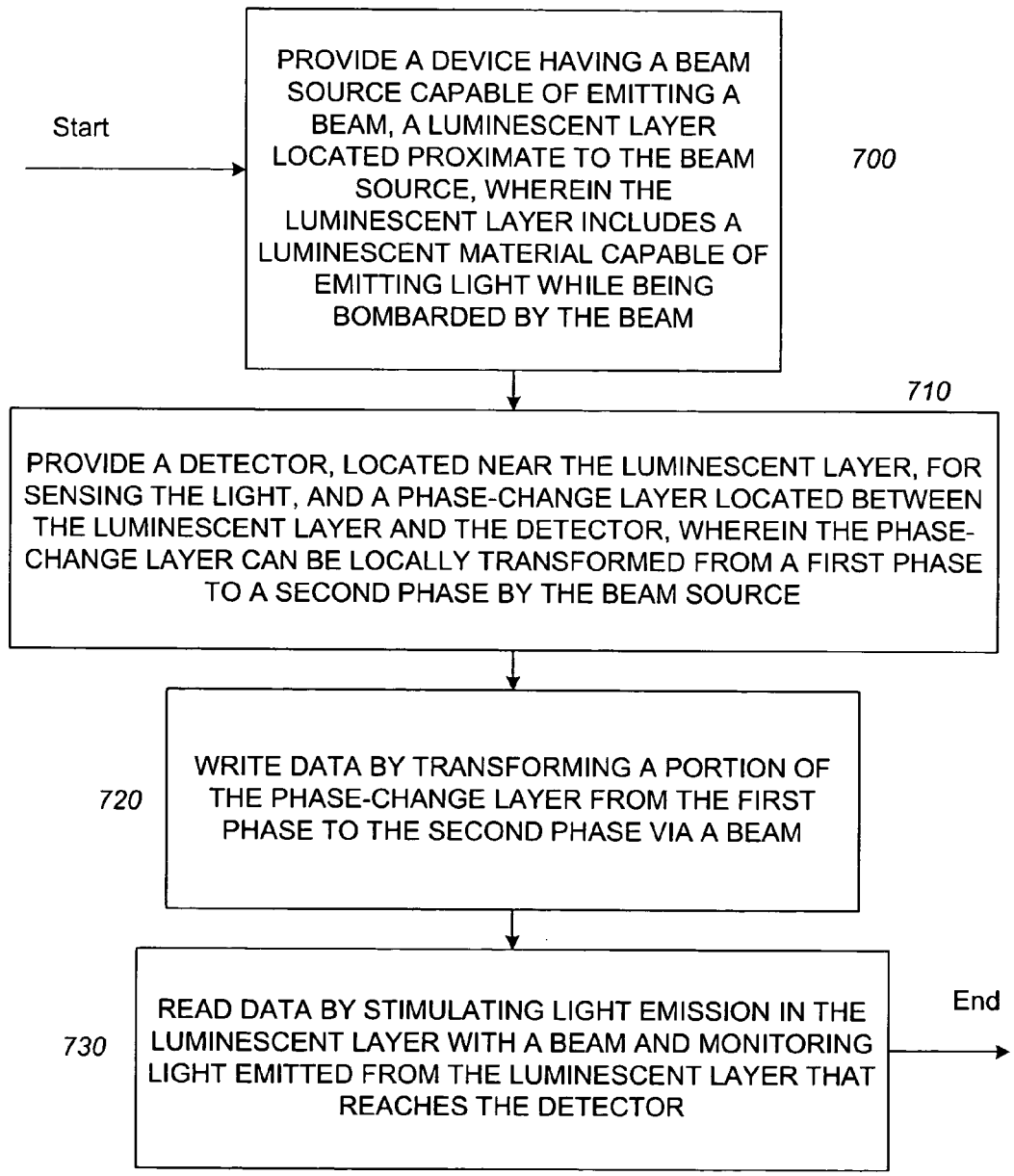
FIG. 7 is a flowchart of a method for storing and retrieving data from a data storage device according to a basic layering design.

FIG. 7 illustrates a flowchart of a method for storing and retrieving data from an ultra-high-density data storage device. Step 700 specifies providing a device having an beam source 200 capable of emitting a beam, a luminescent layer 210, located proximate to the beam source 200, wherein the luminescent layer 210 includes a luminescent material capable of emitting light while being bombarded by the beam. Step 710 also specifies providing a detector 220, located near the luminescent layer 210, for sensing the light and a phase-change layer 230 located between the luminescent layer 210 and the detector 230, wherein the phase-change layer 230 can be locally transformed from a first phase to a second phase by the beam source 200. Step 720 then specifies writing data by transforming a portion of the phase-change layer 230 from the first phase to the second phase via a light beam. Finally, step 730 specifies reading data by stimulating light emission in the luminescent layer 210 with a light beam and monitoring the light emitted from the luminescent layer 210 that reaches the detector 220. As used herein, the embodiment described in FIG. 7, having luminescent material adjacent to a beam source and located on top of phase-change material, which is in turn located above a detector, is referred to as the "basic layering design."

Alternate Layering

Figure 8:
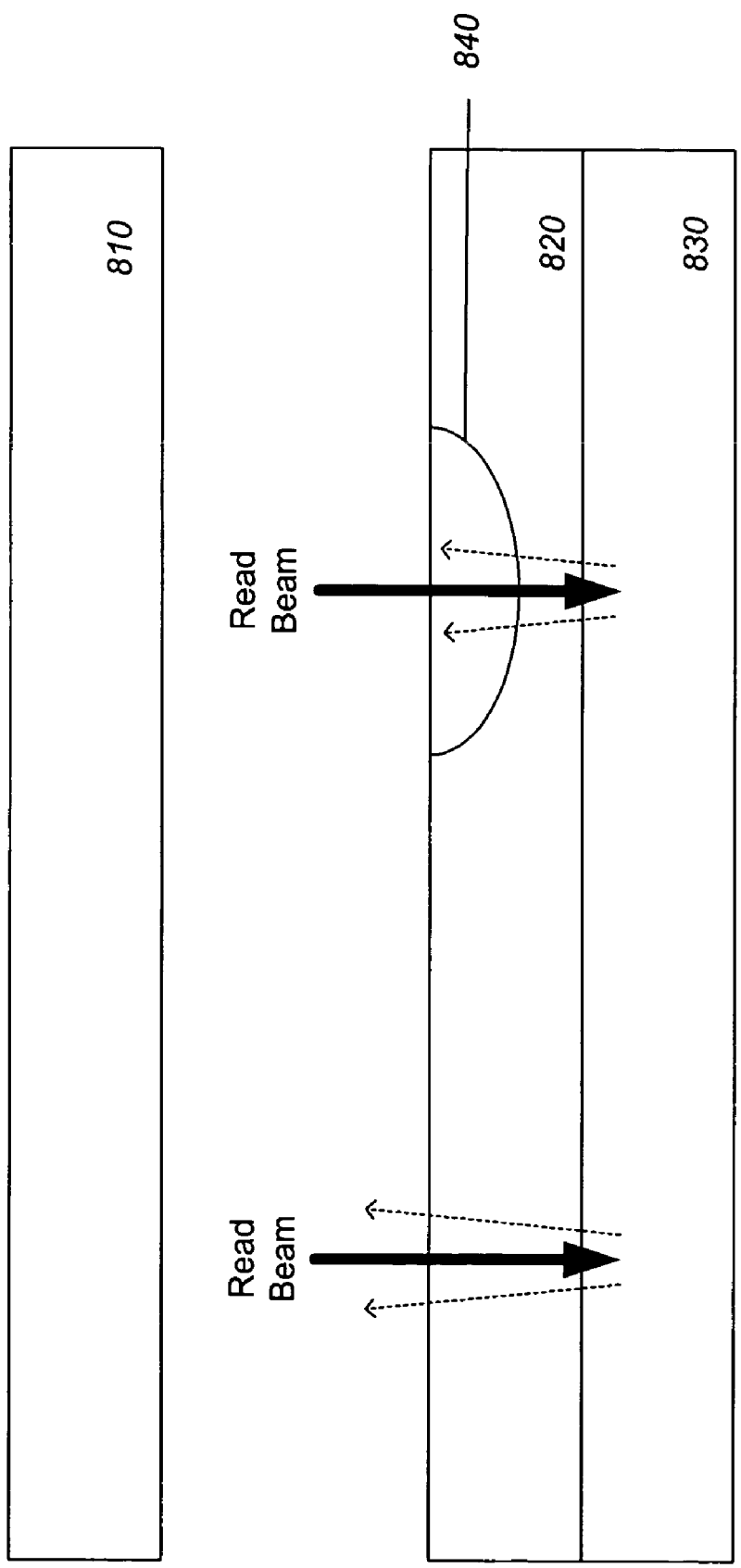
FIG. 8 is a cross-sectional view of a first alternate embodiment of a data storage device having phase-change material on top of luminescent material with a photodetector or detector above the phase-change material.
Figure 9:
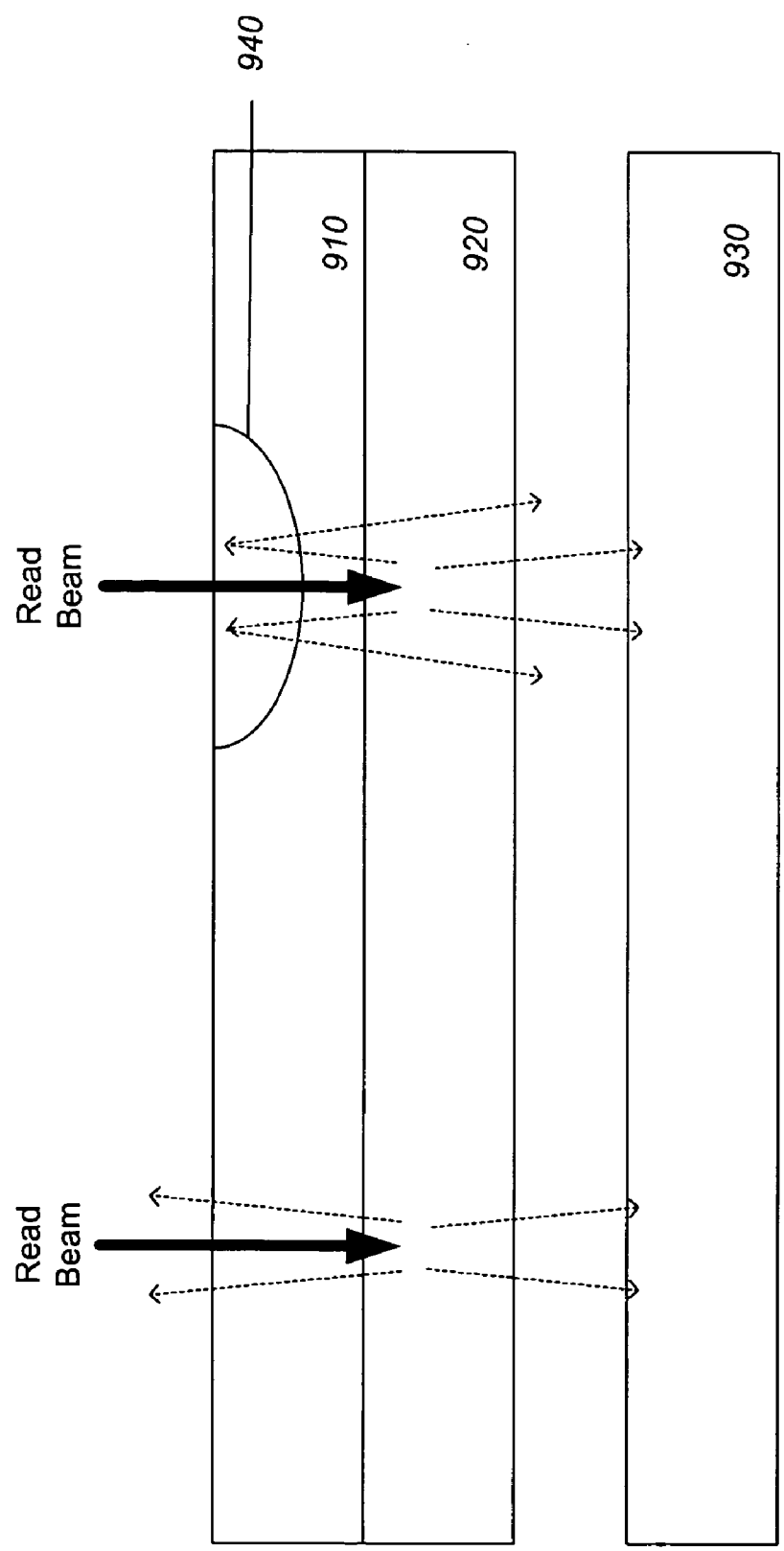
FIG. 9 is a cross-sectional view of a second alternate embodiment of a data storage device having phase-change material proximate the beam transmitter and on top of luminescent material with a photodetector or detector below the luminescent material.
Figure 10:
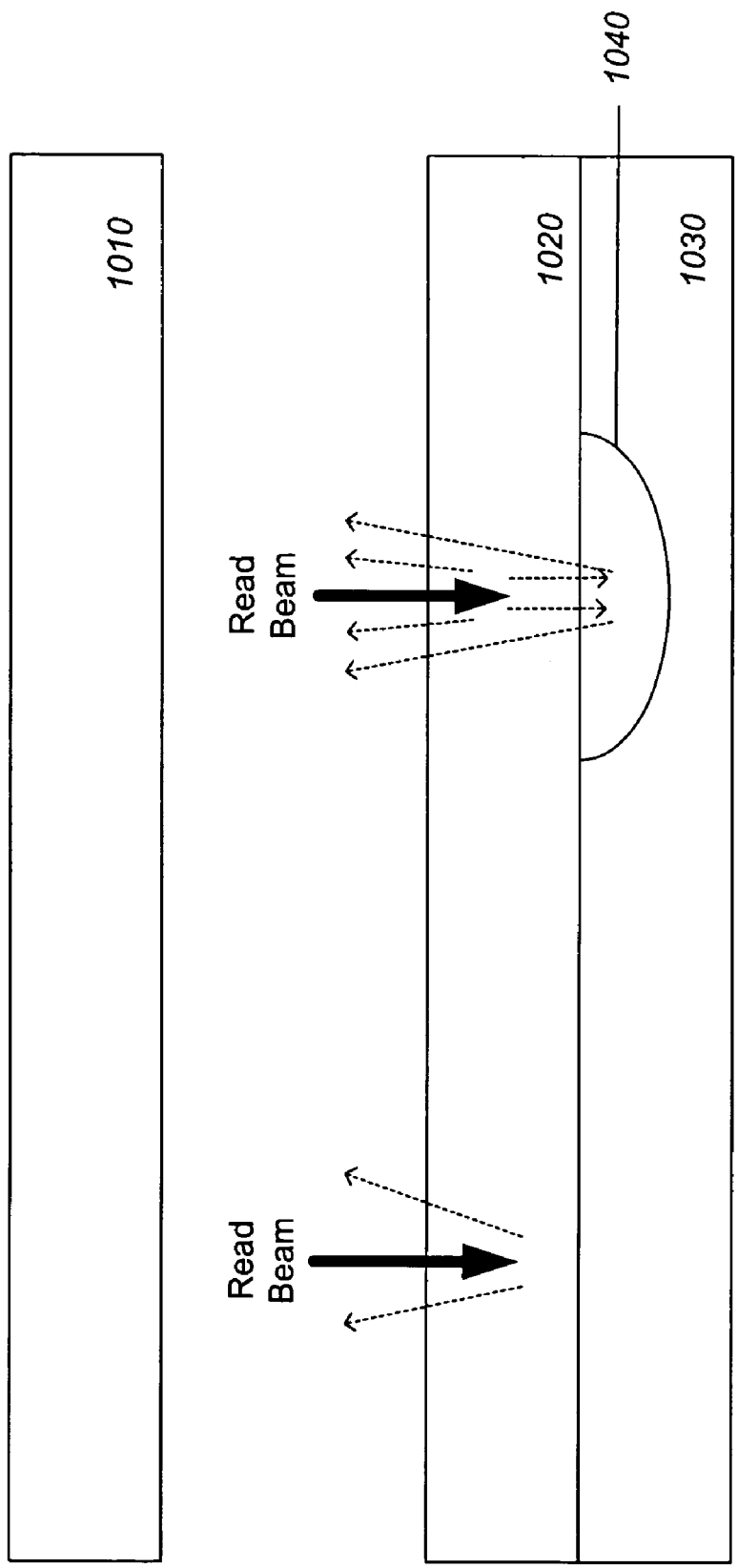
FIG. 10 is a cross-sectional view of a third alternate embodiment of a data storage device having a luminescent layer on top of a phase-change layer with a photodetector or detector above the luminescent layer.

An alternate placement or reordering of the luminescent layer, phase-change layer, and detector is presented in the embodiment of FIG. 8, referred to herein as the "first alternative embodiment." From FIG. 8, detector 810 is located above the phase-change layer 820, which is deposited on the luminescent layer 830. The phase-change layer 820 is reasonably transparent to the beam, which may be a read beam or a write beam, so that an appreciable fraction of the beam reaches the luminescent layer 830. While a read beam is illustrated in FIGS. 8-10, it is to be understood that a read beam or write beam may be provided in the orientations illustrated by the beams shown therein. From FIG. 8, a relatively large fraction of the induced luminescent light, illustrated by dashed lines, reaches the detector 810 when the read beam stimulates a portion of the luminescent layer 830 below a portion of the phase-change layer 820 that is in a state relatively transparent to portions of the spectrum of light emitted by the luminescent layer 830. If, on the other hand, the beam is incident on a region of the luminescent layer 830 that is below a relatively opaque, phase-changed region of the phase-change layer 820, such as written bit 840, less light reaches the detector 810. Thus the system is able to differentiate between written bits and unwritten areas of the phase-change layer 820.

If an optical read beam is employed, differences in the transmissivity of the phase-change layer in the wavelength range of the optical beam, affected by local changes in the phase of the phase-change layer, can alter the amount of light reaching the luminescent layer 830, thereby altering the amount of light generated. A combination of modulating both the transmission of the read beam through the phase-change layer 820 and the fraction of generated luminescent light reaching the detector 810 may also be employed.

The storage mechanism embodiment of FIG. 8 takes advantage of the absorption of the luminescent light by the phase-change material, depending on whether light passes through a written or unwritten region. Again, the system writes data using an electron or optical beam to locally affect a state change in the phase-change layer. Such a state change may occur by heating the phase-change layer 830 with an appropriate time-temperature profile and/or by rearranging bonds and/or atomic positions by bombardment using electrons or photons. The change of state may be between an amorphous and crystalline phase, or between various crystalline phases having different optical properties. The system uses a low power density electron or optical beam to locally stimulate luminescence in the luminescent layer 830 and read the data. Depending upon the state of the phase-change layer 820 above the stimulated region, either more or less light reaches the detector 810 to produce a signal. Changes in the absorption coefficient and/or reflectivity of the phase-change material at the wavelengths emitted by the luminescent layer may shift the amount of light reaching the detector 810. In this embodiment, the phase-change and luminescent layers may be deposited on a wider variety of substrate materials than those embodiments having the detector located below the storage medium. This arrangement enables more freedom to choose a substrate where the layers will grow with better phase-change properties, both thermal and optical, and luminescent properties. Further, this enables selection of a substrate layer or layers able to reflect luminescent light directed downward in the orientation shown, toward the substrate, back up through the phase-change layer 820 and to the detector 810, where the reflected luminescent light can add to the signal from the light that was originally emitted up from the luminescent layer 830 and through the phase-change layer 820. Thus during the write process, the write beam impinges on the phase-change layer before reaching the luminescent layer. This facilitates affecting a phase-change in the phase-change layer without adversely impacting the luminescent layer and can also reduce the power required to write relative to embodiments where the phase-change layer is beneath the luminescent layer.

In certain constructions of the design, the phase-change layer may be fabricated sufficiently thin for a significant fraction of an electron read beam to pass through the phase-change layer 820 and to the luminescent layer 830. The allowed thickness of the phase-change layer in such a configuration tends to increase for higher energy electron beams and lower mass density and/or lower atomic number phase-change layers.

Figure 11:
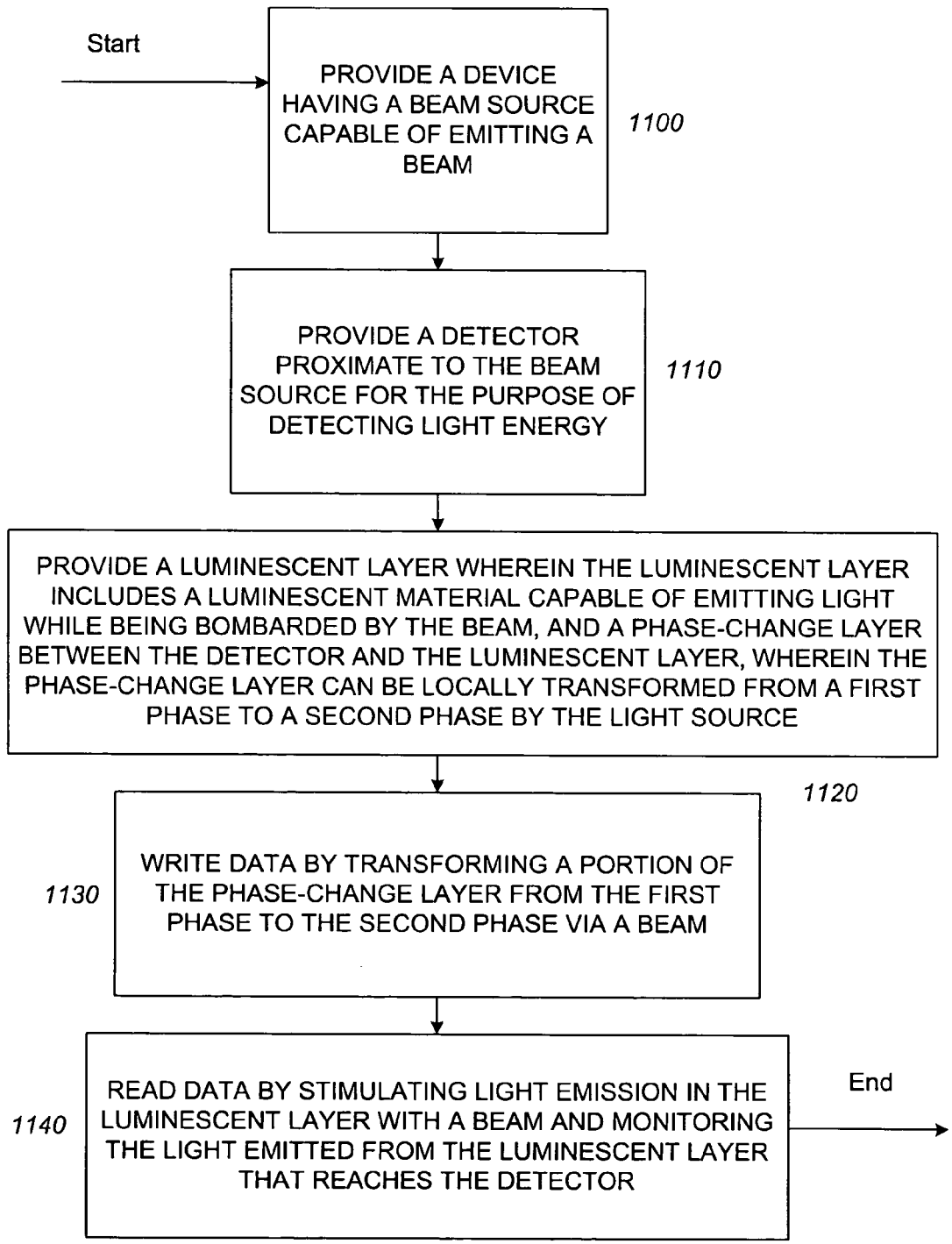
FIG. 11 is a flowchart of a method for storing and retrieving data from a data storage device according to the first alternate embodiment of FIG. 8.

FIG. 11 illustrates a flowchart of a method for storing and retrieving data from an ultra-high-density data storage device according to the first alternate embodiment shown in FIG. 8. Step 1100 specifies providing a device having an beam source 200 capable of emitting a beam. Step 1110 calls for providing a detector 810 proximate to the beam source 200, for sensing light energy. Step 1120 specifies providing a luminescent layer 830 wherein the luminescent layer 830 includes a luminescent material capable of emitting light while being bombarded by the beam, and a phase-change layer 820 between the detector 810 and the luminescent layer 830, wherein the phase-change layer 820 can be locally transformed from a first phase to a second phase by the beam source. Step 1130 then specifies writing data by transforming a portion of the phase-change layer 820 from the first phase to the second phase via a light beam. Finally, step 1140 specifies reading data by stimulating light emission in the luminescent layer 830 with a light beam and monitoring the light emitted from the luminescent layer 830 that reaches the detector 810.

An alternate embodiment of the present design is shown in FIG. 9, referenced herein as the "second alternative embodiment," where the phase-change layer 910 is adjacent luminescent layer 920 and energy from the luminescent layer 920 reaches detector 930. Thus the phase-change material is located on top of the luminescent material and the detector is below the luminescent material. In this embodiment, the storage mechanism takes advantage of changes in the reflection of the luminescent light by the phase-change material, depending upon whether the system addresses a written or unwritten region. Bits may be read using an electron or optical beam to locally stimulate radiation from the luminescent layer, as described above. Variations in the reflectivity of the phase-change layer due to the write process can alter the amount of light reflected back to the detector 930 and producing a signal.

In the arrangement shown in FIG. 9, the read beam incident through the unwritten region, from above as shown, allows for only a small fraction of emitted light to be reflected to the detector 930. In the presence of written bit 940, the read beam incident through the written region enables some light emitted in the upward direction as shown to be reflected from the written bit 940 and reflected back toward the detector 930. The resultant signal difference provides the ability to differentiate between a written bit and an unwritten bit during the read process. Alternately, the written regions may be fabricated to be less reflective than the unwritten regions, as long as reflection of the read beam provides a sufficient energy differential to be discernable by the detector 930 and subsequent processing electronics.

When the detector 930 is positioned below the storage medium, where the storage medium comprises the phase-change layer and the luminescent layer, the detector 930 can be more readily fabricated to subtend a larger solid angle relative to the region where luminescence occurs, thereby providing the ability to obtain a larger signal. Placing the detector 930 above the storage medium without interfering with the read and write beams or the equipment that produce them can be complicated. For example, an electron emitter operated in close proximity to the storage medium (to facilitate focusing) can subtend a large fraction of the solid angle above the storage medium, precluding placement of the detector 930 in that position.

Further, the arrangement illustrated in FIG. 9 can require less power to perform a writing task than in an arrangement where the phase-change layer 910 is located below the luminescent layer 920. Also, the luminescent layer 920 is less likely to be damaged during the write process if the phase-change layer 910 is located above the luminescent layer 920.

If an optical beam is employed, differences in the transmissivity of the phase-change layer in the wavelength range of the optical beam, affected by local changes in the phase of the phase-change layer, can alter the amount of light reaching the luminescent layer 920, thereby altering the amount of light generated. A combination of modulating both the transmission of the read beam through the phase-change layer 910 and the fraction of generated luminescent light reaching the detector 930 may also be employed.

Figure 12:
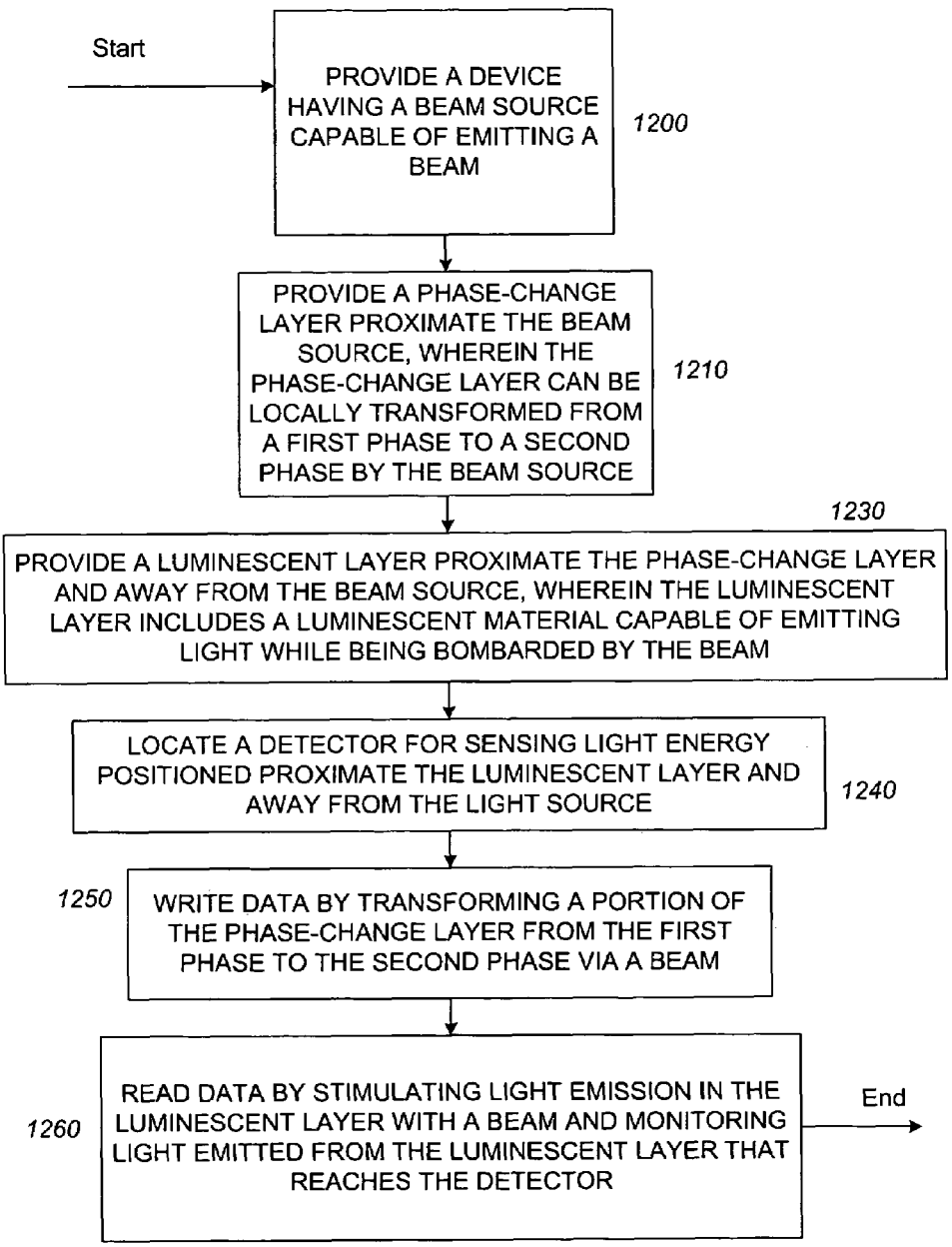
FIG. 12 is a flowchart of a method for storing and retrieving data from a data storage device according to the second alternate embodiment of FIG. 9.

FIG. 12 illustrates a flowchart of a method for storing and retrieving data from an ultra-high-density data storage device according to this second alternate embodiment illustrated in FIG. 9. Step 1200 specifies providing a device having an beam source 200 capable of emitting a beam. Step 1210 calls for providing a phase-change layer 910 proximate the beam source 200, wherein the phase-change layer 920 can be locally transformed from a first phase to a second phase by the beam source 200. Step 1220 specifies providing a luminescent layer 920 proximate the phase-change layer 910 and away from the beam source 200, wherein the luminescent layer 920 includes a luminescent material capable of emitting light while being bombarded by the beam. Step 1230 provides for a locating a detector 930 for sensing light energy, positioned proximate the luminescent layer 920 and also away from the beam source 200. Step 1240 then specifies writing data by transforming a portion of the phase-change layer 910 from the first phase to the second phase via a light beam. Finally, step 1250 specifies reading data by stimulating light emission in the luminescent layer 920 with a light beam and monitoring the light emitted from the luminescent layer 920 that reaches the detector 930.

Another alternate embodiment to the present design is illustrated in the embodiment of FIG. 10, referenced herein as the "third alternate embodiment." From FIG. 10, detector 1010 is located above the luminescent layer 1020, which in turn is located above the phase-change layer 1030. The written bit 1040 is below the luminescent layer 1020 in this embodiment. As shown, the read beam incident to the unwritten area provides relatively small quantities of light reflected back to the detector 1010. The read beam incident above the written bit in this configuration provides more light reflected from the phase-changed written bit 1040 back to the detector 1010. Alternately, the written regions could be manufactured to be less reflective than the unwritten regions, again as long as reflection of the read beam provides a sufficient energy differential to be discernable by the detector 1010 and subsequent processing electronics. Note that in this embodiment, a reflective layer may be located below the phase-change layer 1030. This implementation can realize advantageous variations in the absorption of the phase-change layer 1030 with changes in state. Some of the light emitted from the luminescent layer 1020 may pass, or not pass, through the phase-change layer 1030, reflect off the reflective layer, and then pass, or not pass, back through the phase-change layer 1030, and subsequently travel through the luminescent layer 1020 to the detector 1010.

In the embodiment of FIG. 10, data is written by using a beam to locally heat the phase-change material with the appropriate time-temperature profile and alter its state. In most cases, the luminescent layer 1020 also becomes relatively hot, particularly if a significant fraction of the energy of the beam is absorbed by the luminescent layer 1020. If a photon beam is employed, heating of the luminescent layer 1020 may be minimized if the write beam is not absorbed in the luminescent layer 1020. If the thickness of the luminescent layer 1020 is minimized, the maximum temperature in the luminescent layer 1020 during the write process can be minimized. Heating of the luminescent layer 1020 during the write process can also be minimized using a luminescent material having a thermal conductivity greater than that of the underlying phase-change layer 1030. Luminescent layer thermal conductivity cannot be too large, or thermal spreading of the absorbed energy will broaden the size of the written bit 1040 in the phase-change layer 1030. A broadened written bit 1040 reduces the density with which information can be recorded. A thinner luminescent layer 1020 can minimize the effects of thermal diffusion.

As an alternative to altering the state of the phase-change material via heating, the system may apply energetic electrons or photons to affect changes in state. Use of energetic electrons or photons can, for example, occur through rearrangement of interatomic bonds or movement of atoms via direct absorption of energy from electrons or photons without appreciably heating a region of the sample. Alternatively, a combination of these effects and heating can be employed to affect a change of state. As in the other embodiments, changes of state include transitions between the amorphous and crystalline states as well as transitions between various crystalline states.

In this embodiment, none of the energy of the read beam is lost in the phase-change layer 1030 before reaching the luminescent layer 1020. It may be easier to stimulate strong luminescence in the luminescent layer 1020 if the luminescent layer 1020 is positioned on top of the phase-change layer 1030. Further, the luminescent layer 1020 can act as a protective layer for the phase-change layer 1030 during the write process. In particular, the luminescent layer 1020 can minimize ablation, sublimation, or evaporation of material from the phase-change layer 1030 and/or unwanted flow or changes in topography of the phase-change material.

Figure 13:
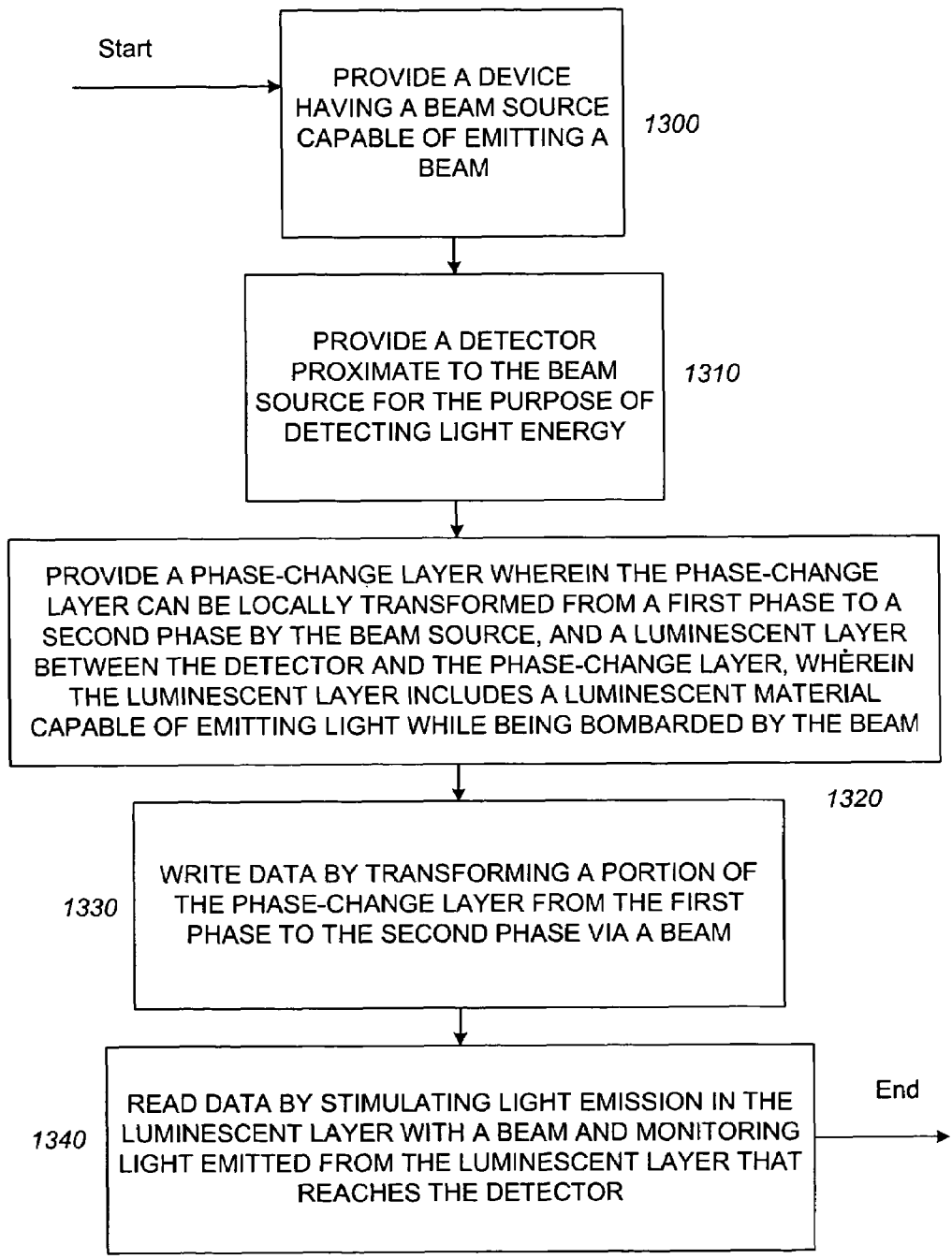
FIG. 13 is a flowchart of a method for storing and retrieving data from a data storage device according to the third alternate embodiment of FIG. 10.

FIG. 13 illustrates a flowchart of a method for storing and retrieving data from an ultra-high-density data storage device according to this third alternate embodiment illustrated in FIG. 10. Step 1300 specifies providing a device having an beam source 200 capable of emitting a beam. Step 1310 calls for providing a detector 1010 proximate to the beam source 200, for sensing light energy. Step 1320 specifies providing a phase-change layer 1030, wherein the phase-change layer 1030 can be locally transformed from a first phase to a second phase by the beam source, and a luminescent layer 1020 between the detector 810 and the phase-change layer 1030 wherein the luminescent layer 1020 includes a luminescent material capable of emitting light while being bombarded by the beam. Step 1330 then specifies writing data by transforming a portion of the phase-change layer 1030 from the first phase to the second phase via a light beam. Finally, step 1340 specifies reading data by stimulating light emission in the luminescent layer 1020 with a light beam and monitoring the light emitted from the luminescent layer 1020 that reaches the detector 1010.

Further enhancements to the foregoing embodiments may be employed. Diffusion barriers may be included between the luminescent layer and phase-change layer, particularly to minimize interatomic diffusion during the write process. Diffusion barriers between the bottom phase-change or luminescent layer and the underlying substrate may also be useful in all four embodiments, where diffusion here refers to the diffusion of atoms as opposed to thermal diffusion of heat.

Anti-reflective coatings may also be useful for maximizing the signal in certain cases, including providing an anti-reflective coating on the top and/or bottom surface of the phase-change layer in the basic layering design and the first alternate embodiment above. Alternately, an anti-reflective coating may be applied on the top and/or bottom surface of the luminescent layer in the second and third alternate embodiments above. Reflective coatings may be useful for maximizing the signal when applied on the top surface of the luminescent layer in the basic layering design or the bottom surface of the luminescent layer in the first alternate embodiment above. Beneficial properties may be realized if the reflective layer reflects luminescent light toward the detector. If the reflective layer reflects an incoming beam, such as the optical read beam, the reflective layer may inhibit overall performance and may be omitted. A reflective coating may also be applied on the top surface of the phase-change material in the second alternate embodiment or the bottom surface of the phase-change material in the third alternate embodiment.

Thermal diffusion barriers may also be useful in minimizing written region sizes as well as minimizing the power required for writing. A layer that filters out light of a certain wavelength or range of wavelengths, placed between the luminescent layer and detector, may also be employed. For example, if the phase-change layer only provided contrast in the absorption or reflection of some of the wavelengths emitted by the luminescent layer then a filter layer could be used to filter out all or part of the light with wavelengths for which the phase-change layer does not provide contrast. Employing this light filtering layer could improve the signal-to-noise ratio of the read process by filtering out light that is not modulated, or only poorly modulated, yet contributes to the noise.

The coatings, barrier layers, and overcoats described above, as appropriate, may be sufficiently transparent to the read beam to accommodate the read process. In the case of an electron read beam, transmission is improved by using thinner layers and materials with low mass densities and atomic numbers. Also, these layers may be able to survive conditions present during the write process, such as extremes of temperature.

In most applications, beneficial effects may be realized by selecting non-reactive materials for all layers of the device. Use of non-reactive materials may be particularly beneficial during the write process. The luminescence of the luminescent layers in the embodiments disclosed may decay at a sufficiently rapid rate so as to enable high speed data readback whenever possible. If luminescence progress is too slow, the last region interrogated may still be luminescing while the next bit is being read, thereby confusing bit detection.

In any of the embodiments, multiple pairs of luminescent and phase-change layers may be used to record more than one bit at a given location in the plane of the storage medium. Beneficial usage of pairs of layers in the device may be accomplished employing luminescent layers that luminesce at different wavelengths in different layer pairs, in combination with phase-change layers that absorb in different wavelength ranges. For example, the following sequence of layers could be used: substrate (bottom), phase-change layer 2, luminescent layer 2, phase-change layer 1, luminescent layer 1 (top). Luminescent layer 2 may luminesce primarily at longer wavelengths than luminescent layer 1. Phase-change layer 1 and luminescent layer 1 may both be largely transparent to the light emitted by luminescent layer 2 in both its written and unwritten states. Two detectors, one sensitive to the light emitted by luminescent layer 1, the other sensitive to light emitted by luminescent layer 2, may be placed above luminescent layer 1. Enough of the read beam may need the ability to penetrate to both luminescent layers to sufficiently stimulate both layers during the read process. In the case of an electron beam, the device may employ sufficiently thin layers and/or materials with generally low mass densities or atomic numbers. In the case of a light read beam, the layers above the luminescent layer may be sufficiently transparent to permit adequate stimulation of both luminescent layers. Similar considerations apply to the write process. The materials and layer thicknesses may be such that the write beams can access the various phase-change layers. In this case, multiple optical beams with different wavelengths can be used to write on the different phase-change layers. In the above example, if phase-change layer 1 is a semiconductor with a bandgap larger than that of phase-change layer 2 and larger than the energy at which luminescent layer 2 luminesces, then the luminescent light emitted by luminescent layer 2 can pass through phase-change layer 1. Also, a write beam 2 can be used to write on phase-change layer 2 where the write beam 2 passes through phase-change layer 1, and luminescent layer 1 if selected to be largely transparent at the wavelength of write beam 2. In this situation, the write beam 2 may be absorbed in phase-change layer 2, thereby causing a change of state in phase-change layer 2. Another write beam 1 can be used that is heavily absorbed in phase-change layer 1, for writing bits in phase-change layer 1, and that, consequently, does not reach phase-change layer 2 with sufficient power-density to write in phase-change layer 2.

The device may also employ multiple luminescent layers with a single phase-change layer if the phase-change layer can be put into multiple states, each of which provide contrast in the reflectivity and/or absorption of the light at the different wavelengths or wavelength ranges emitted by the various luminescent layers. The system may also write multiple bits in the above embodiments using a single pair of phase-change and luminescent layers. Such writing may be available if the phase-change layer can be put into intermediate states with fractional changes in phase-change layer reflectivity, or absorption of the light emitted by the luminescent layer.

While the aforementioned and illustrated devices and methods for storing and retrieving ultra-high density data have been described in connection with exemplary embodiments, those skilled in the art will understand that many modifications in light of these teachings are possible, and this application is intended to cover any variation thereof. Accordingly, any and all modifications, variations, or equivalent arrangements which may occur to those skilled in the art, should be considered to be within the scope of the present invention as defined in the appended claims.

What is claimed is:

1. A data storage device for use with a beam transmitter configured to transmit a beam, comprising:
   a luminescent layer comprising a luminescent material capable of emitting light while being bombarded by the beam from the beam transmitter;
   a detector located near the luminescent layer for detecting the light emitted from the luminescent layer; and
   a phase-change layer located between the luminescent layer and the detector, said phase-change layer able to transform from a first phase to a second phase;
   the first phase of the phase-change layer enables transmission of material more light through the phase-change layer from the luminescent layer to the detector than the second phase of the phase-change layer wherein light emitted from the luminescent layer and received by the detector materially differs in opacity when the phase-change layer transforms from the first phase to the second phase.

2. The device of claim 1, wherein the first phase of the phase-change layer represents an unwritten region of the phase-change layer and the second phase of the phase-change layer represents a written region of the phase-change layer.

3. The device of claim 1, wherein the first phase of the phase-change layer represents a written region of the phase-change layer and the second phase of the phase-change layer represents an unwritten region of the phase-change layer.

4. The device of claim 1, wherein the beam comprises a low power density photon beam lacking sufficient power to cause the phase-change layer to change from the first phase to the second phase.

5. The device of claim 1, wherein the beam comprises a low power density electron beam lacking sufficient power to cause the phase-change layer to change from the first phase to the second phase.

6. The device of claim 1, wherein the luminescent layer comprises a material having a high thermal conductivity.

7. The device of claim 1, wherein the luminescent layer comprises a material having a low thermal conductivity.

8. The device of claim 1, wherein the luminescent layer and the phase-change layer are adjacent and share an interface.

9. The device of claim 8, wherein the interface has a radiative recombination rate and a non-radiative recombination rate that each depend on whether the neighboring region of the phase-change layer is in the first phase or the second phase.

10. The device of claim 1, wherein the luminescent layer comprises at least one of a YAG-based material, a rare earth element dopant, a YAP-based material, GaN, Zn oxide, Zn sulfide, and $Si_3O_4$.

11. The device of claim 1, wherein the luminescent layer comprises an optically neutral medium and optically active nanoparticles in the optically neutral medium.

12. A data storage device for use with a beam transmitter configured to transmit a beam, comprising:
   a luminescent layer comprising a luminescent material capable of emitting light while being bombarded by the beam from the beam transmitter;
   a phase-change layer located between the luminescent layer and the beam transmitter, said phase-change layer able to transform from a first phase to a second phase; and
   a detector located proximate the luminescent layer for detecting the light emitted from the luminescent layer;
   wherein light emitted from the luminescent layer and received by the detector materially differs when the phase-change layer transforms opacity from the first phase to the second phase.

13. The device of claim 12, wherein the first phase of the phase-change layer enables transmission of materially more light from the luminescent layer to the detector than the second phase of the phase-change layer.

14. The device of claim 13, wherein the first phase of the phase-change layer represents an unwritten region of the phase-change layer and the second phase of the phase-change layer represents a written region of the phase-change layer.

15. The device of claim 13, wherein the first phase of the phase-change layer represents a written region of the phase-change layer and the second phase of the phase-change layer represents an unwritten region of the phase-change layer.

16. The device of claim 12, wherein the beam comprises a low power density beam lacking sufficient power to cause the phase-change layer to change from the first phase to the second phase.

17. The device of claim 12, wherein the luminescent layer comprises at least one of a YAG-based material, a rare earth element dopant, a YAP-based material, GaN, Zn oxide, Zn sulfide, and $Si_3O_4$.

18. The A device for use with a beam transmitter configured to transmit a beam, comprising:
   a luminescent layer comprising a luminescent material capable of emitting light while being bombarded by the beam from the beam transmitter;
   a detector located near the luminescent layer and the beam transmitter for detecting the light emitted from the luminescent layer, and
   a phase-change layer located adjacent the luminescent layer such that the luminescent layer is positioned between the detector and the phase-change layer, said phase-change layer able to transform from a first phase to a second phase;
   wherein light emitted from the luminescent layer and received by the detector materially differs when the phase-change layer transforms from the first phase to the second phase.

19. The device of claim 18, wherein the first phase of the phase-change layer enables transmission of materially more light from the luminescent layer to the detector than the second phase of the phase-change layer.

20. The device of claim 19, wherein the first phase of the phase-change layer represents an unwritten region of the phase-change layer and the second phase of the phase-change layer represents a written region of the phase-change layer.

21. The device of claim 19, wherein the first phase of the phase-change layer represents a written region of the phase-change layer and the second phase of the phase-change layer represents an unwritten region of the phase-change layer.

22. The device of claim 18, wherein the beam comprises a low power density beam lacking sufficient power to cause the phase-change layer to change from the first phase to the second phase.

23. The device of claim 18, wherein the luminescent layer comprises at least one of a YAG-based material, a rare earth element dopant, a YAP-based material, GaN, Zn oxide, Zn sulfide, and $Si_3O_4$.

24. The device of claim 18, further comprising an anti-reflective coating located proximate the phase-change layer.

25. The device of claim 18, further comprising a thermal diffusion layer located proximate the phase-change layer.

26. The device of claim 18, further comprising a reflective layer proximate the phase-change layer.

27. The device of claim 18, wherein the phase-change layer comprises a plurality of layers of phase-change material.

28. The device of claim 18, wherein the luminescent layer comprises a plurality of layers of luminescent material.

29. The device of claim 1, further comprising an anti-reflective coating located proximate the phase-change layer.

30. The device of claim 1, further comprising a thermal diffusion layer located proximate the phase-change layer.

31. The device of claim 1, further comprising a reflective layer proximate the phase-change layer.

32. The device of claim 1, wherein the phase-change layer comprises a plurality of layers of phase-change material.

33. The device of claim 1, wherein the luminescent layer comprises a plurality of layers of luminescent material.

34. The device of claim 12, further comprising an anti-reflective coating located proximate the phase-change layer.

35. The device of claim 12, further comprising a thermal diffusion layer located proximate the phase-change layer.

36. The device of claim 12, further comprising a reflective layer proximate the phase-change layer.

37. The device of claim 12, wherein the phase-change layer comprises a plurality of layers of phase-change material.

38. The device of claim 12, wherein the luminescent layer comprises a plurality of layers of luminescent material.

39. A method for storing data on a data storage device comprising a phase change layer and a luminescent layer, the method comprising:
   bombarding the luminescent layer with a beam, causing the luminescent layer to emit light;
   detecting the light emitted from the luminescent layer using a detector; and
   writing data by transforming the phase change layer from a first phase to a second phase; wherein light emitted from the luminescent layer and detected by the detector materially differs when the phase-change layer transforms opacity from the first phase to the second phase.

* * * * *

UNITED STATES PATENT AND TRADEMARK OFFICE
CERTIFICATE OF CORRECTION

| | |
|---|---|
| PATENT NO. | : 7,239,600 B2 |
| APPLICATION NO. | : 10/699150 |
| DATED | : July 3, 2007 |
| INVENTOR(S) | : Gary Gibson |

It is certified that error appears in the above-identified patent and that said Letters Patent is hereby corrected as shown below:

In column 18, line 44, in Claim 17, delete "Si.sub.30.sub.4" and insert -- Si.sub.3O.sub.4 --, therefor.

In column 18, line 52, in Claim 18, delete "layer," and insert -- layer; --, therefor.

Signed and Sealed this

Third Day of November, 2009

David J. Kappos
*Director of the United States Patent and Trademark Office*